US009836530B2

(12) United States Patent
Priel et al.

(10) Patent No.: US 9,836,530 B2
(45) Date of Patent: Dec. 5, 2017

(54) DETERMINING PREFERRED COMMUNICATION EXPLANATIONS USING RECORD-RELEVANCY TIERS (71) Applicant: HEWLETT PACKARD ENTERPRISE DEVELOPMENT LP, Houston, TX (US)

(72) Inventors: Tomer Priel, Yehud (IL); Ira Cohen, Yehud (IL); Eli Mordechai, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/101,744

(22) PCT Filed: Dec. 16, 2013

(86) PCT No.: PCT/US2013/075344
§ 371 (c)(1),
(2) Date: Jun. 3, 2016

(87) PCT Pub. No.: WO2015/094158
PCT Pub. Date: Jun. 25, 2015

(65) Prior Publication Data
US 2016/0378850 A1    Dec. 29, 2016

(51) Int. Cl.
*G10L 15/08* (2006.01)
*G06F 17/30* (2006.01)
(Continued)

(52) U.S. Cl.
CPC ........ *G06F 17/30675* (2013.01); *G06F 17/40* (2013.01); *G06Q 10/00* (2013.01); *G10L 15/08* (2013.01); *G10L 2015/088* (2013.01)

(58) Field of Classification Search
CPC ....... G10L 15/22; G10L 15/26; G10L 15/265; G10L 15/08; G06F 17/30029;
(Continued)

(56) References Cited

U.S. PATENT DOCUMENTS 7,685,199 B2 * 3/2010 Chandrasekar ... G06F 17/30663
707/602
7,797,315 B2 * 9/2010 Morisawa ........... G06F 17/3087
707/725
(Continued)

FOREIGN PATENT DOCUMENTS

WO    WO-2004109549 A2    12/2004

OTHER PUBLICATIONS

Korean Intellectual Property Office, International Search Report and Written Opinion, Sep. 16, 2014, 10 pages, Daeieon Metropolitan City, Republic of Korea.

(Continued)

*Primary Examiner* — Martin Lerner (57) ABSTRACT

In one example of the disclosure, data indicative of a word or phrase communicated during a meeting including a plurality of participants is obtained. For each participant, records electronically accessible to the participant are identified, and each record is associated with a tier from a hierarchy of record-relevancy tiers. A set of explanations for the communication and associated scores is identified, including for each participant, beginning with a most relevant tier, searching the records accessible to the participant tier by tier until an explanation is identified, and assigning a score to the explanation according to the tier associated with the record in which the explanation is found. A preferred explanation for the communication is determined based upon the scores, and a display of the preferred explanation is caused.

15 Claims, 7 Drawing Sheets

(51) Int. Cl.
  *G06F 17/40* (2006.01)
  *G06Q 10/00* (2012.01)
(58) Field of Classification Search
  CPC ......... G06F 17/30442; G06F 17/30666; G06F 17/30719
  USPC .................. 704/235, 270; 707/732, 781, 786
  See application file for complete search history.

(56) References Cited

U.S. PATENT DOCUMENTS

| | | | |
|---|---|---|---|
| 7,844,603 B2 * | 11/2010 | Lucovsky | G06F 17/30867 |
| | | | 707/732 |
| 8,065,328 B2 * | 11/2011 | Strandel | G06Q 10/107 |
| | | | 707/781 |
| 8,504,369 B1 | 8/2013 | Chigier et al. | |
| 8,589,392 B2 * | 11/2013 | Topatan | G06F 17/30011 |
| | | | 707/732 |
| 8,612,211 B1 * | 12/2013 | Shires | G10L 15/26 |
| | | | 704/235 |
| 8,849,810 B2 * | 9/2014 | Lucovsky | G06F 17/30864 |
| | | | 707/732 |
| 8,972,399 B2 * | 3/2015 | Bennett | G06F 17/30867 |
| | | | 707/732 |
| 9,020,932 B2 * | 4/2015 | Gopinath | G06F 17/30705 |
| | | | 707/722 |
| 9,258,406 B2 * | 2/2016 | Jung | G06F 17/30746 |
| 9,288,000 B2 * | 3/2016 | Kraenzel | G10L 15/265 |
| 2005/0108219 A1 * | 5/2005 | De La Huerga | G06F 17/30575 |
| 2008/0112690 A1 * | 5/2008 | Shahraray | H04N 5/44543 |
| | | | 386/262 |
| 2008/0235018 A1 * | 9/2008 | Eggen | G10L 15/26 |
| | | | 704/251 |
| 2008/0263019 A1 | 10/2008 | Harrison et al. | |
| 2008/0319750 A1 * | 12/2008 | Potter | G10L 15/26 |
| | | | 704/255 |
| 2009/0327400 A1 * | 12/2009 | Singh | G06F 17/30663 |
| | | | 709/202 |
| 2010/0185437 A1 | 7/2010 | Visel | |
| 2010/0235894 A1 * | 9/2010 | Allen, Jr. | G10L 15/26 |
| | | | 704/275 |
| 2011/0295612 A1 | 12/2011 | Donneau-Golencer et al. | |
| 2012/0089395 A1 | 4/2012 | Chavez et al. | |
| 2012/0158719 A1 * | 6/2012 | Gannu | G06F 17/2785 |
| | | | 707/732 |
| 2012/0233155 A1 | 9/2012 | Gallmeier et al. | |
| 2012/0310949 A1 * | 12/2012 | Cohen | G06F 17/30699 |
| | | | 707/748 |
| 2013/0054588 A1 | 2/2013 | Levinson et al. | |
| 2016/0378870 A1 * | 12/2016 | Brunn | G06F 17/30867 |
| | | | 707/732 |

OTHER PUBLICATIONS

Stinson, M. et al., Real-time Speech-to-text Services, Jul. 12, 1999, 23 pages http://www.pepnet.org/sites/default/files/53Real-Time%20Speech-to-text%20Services.pdf.
"AT&T Watson (SM) Speech Technologies", AT&T Labs Research—AT&T Wason (SM) Speech Technologies, 2 pages. Retrieved from internet on Jul. 27, 2017. <http://wwwresearch.att.com/projects/WATSON/?fbid=qdSI_jQGaWq>.
Leah S. Larkey et al, "Acrophile: An Automated Acronym Extractor and Server", Proceedings of the ACM Fifth International Conference on Digital Libraries, DL '00, Dallas TX, May 2000.
Sunghwan Sohn, et al., "Abbreviation definition identification based on automatic precision estimates", BMC Bioinformatics, National Centre for Biotechnology Information, National Library of Medicine, National Institutes of Health, Bethesda, MD, USA, Sep. 25, 2008, 10 pages.
Xiaonan Ji et al., "Mining, Ranking, and Using Acronym Patterns", Apr. 26, 2008.

* cited by examiner

DETERMINING PREFERRED COMMUNICATION EXPLANATIONS USING RECORD-RELEVANCY TIERS

CROSS-REFERENCE TO RELATED APPLICATION

This application is a U.S. National Stage Application of and claims priority to International Patent Application No. PCT/US2013/075344, filed on Dec. 16, 2013, and entitled "DETERMINING PREFERRED COMMUNICATION EXPLANATIONS USING RECORD-RELEVANCY TIERS", the entire content of which is hereby incorporated in its entirety.

BACKGROUND

A meeting can be defined as a gathering of two or more people that is convened for the purpose of achieving a common goal through interaction of the participants, such as sharing information or reaching agreement. Meetings may occur face to face or virtually, and may be facilitated by a communications technology such as a telephone conference call, a voice-over-IP conference call, a videoconference, or an online chat.

DETAILED DESCRIPTION

Introduction

A common impediment to productivity in a meeting is that a participant utilizes an acronym, buzzword, word, phrase, or other communication that may be unknown or unfamiliar to the other meeting participants. In some situations the unfamiliar communication can be significant to the understanding of the conversation. In many situations it can be difficult for a meeting participant to understand what is being said and to meaningfully continue with the meeting without having to interrupt the conversation and ask about the definition. Self-help steps during the meeting, such as trying to find a definition or other explanation for communication using an internet search engine, can be problematic in that such activities can be a distraction from the meeting, and will often yield an erroneous explanation or a valid explanation hidden among a long list of search results. Even if a communication seems familiar to a participant, there may still be lack of understanding between participants as the communication may have multiple meanings. For example the acronym "TCP" can have multiple meanings—"TCP" can be a Tool Center Point, a Tactical Command Post or a Transmission Control Protocol. The more diverse the fields or training of the meeting participants, the more likely it is that there will be confusion regarding communicated words and phrases.

To address these issues, various embodiments described in more detail below provide for a system and a method to determine preferred explanations for words or phrases communicated in a meeting by using tiers indicative of relevance to a meeting. In an example of the disclosure, data indicative of a word or phrase communicated during a meeting is obtained. For each participant in the meeting, records electronically accessible to the participant are identified, and each record is associated with a record-relevancy tier from a hierarchy of record-relevancy tiers. Each tier of the hierarchy is indicative of a record or record type's relevance to the meeting. A set of explanations and an associated score for each explanation is identified. For each participant, a search of records accessible to that participant is conducted, beginning with a most relevant tier and continuing tier by tier until an explanation is identified. Responsive to identification of an explanation, a score is assigned to the explanation according to the tier associated with the record in which the explanation is found. Based upon the scores, a preferred explanation is determined and is caused to be displayed with the communication for viewing by one or more of the meeting participants.

In this manner, embodiments of this disclosure present an automated and efficient manner to provide to participants preferred explanations for words and phrases expressed in a meeting. Acronyms, buzzwords and other key words and phrases utilized in a meeting can be identified, and relevant information about the words and phrases can be automatically and efficiently displayed for the benefit meeting participants. In an example, the identified acronym, buzzword, or other key word or phrase communication from the meeting may be displayed to the participants as a set of key communications, with the size or location of a communication or its preferred explanation in the display areas indicative of importance to the meeting relative to other preferred explanations. In another example, in which a same word or phrase communication is expressed by multiple participants during a meeting, an order in which the participants expressed the communication is determined. Relevance scoring is adjusted to indicate a higher relevance for an explanation that was identified in records accessible to the first participant to express the communication.

Meeting participants, meeting sponsors, designers and users of online meeting services, and designers of the computing devices that facilitate online meeting services will appreciate the ability to significantly increase the effectiveness and efficiency of meetings, and thereby accomplish considerable people, equipment, and facilities cost savings as meeting times and meeting occurrences are reduced.

The following description is broken into sections. The first, labeled "Environment," describes an environment in which various embodiments may be implemented. The second section, labeled "Components," describes examples of various physical and logical components for implementing various embodiments. The third section, labeled "Illustrative Example," presents an example of determining preferred communication explanations using record-relevancy tiers. The fourth section, labeled as "Operation," describes steps taken to implement various embodiments.

Environment

Figure 1:
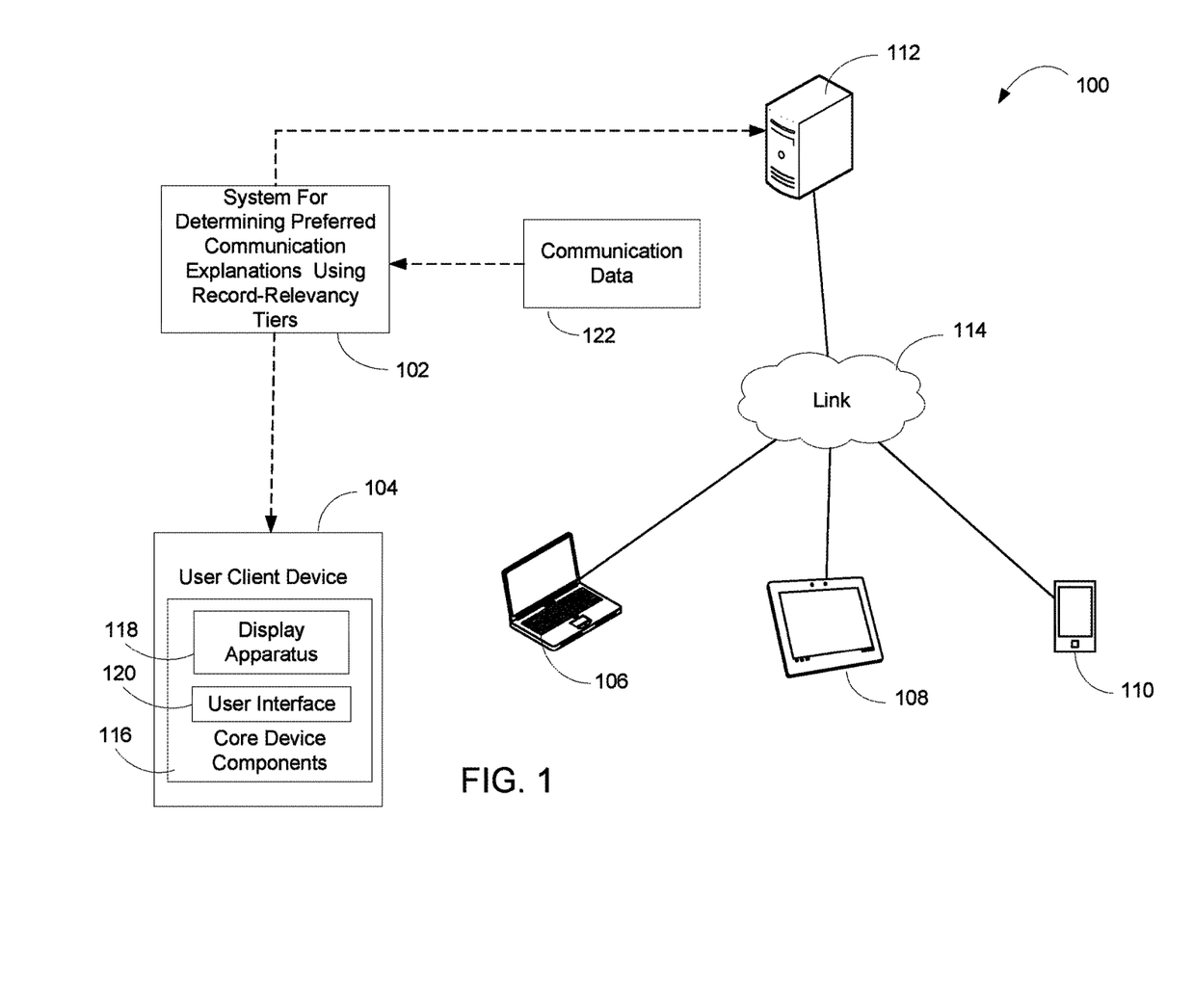
FIG. 1 is a block diagram depicting an example environment in which various embodiments may be implemented.

FIG. 1 depicts an example environment 100 in which embodiments may be implemented as a system for determining preferred communication explanations using record-relevancy tiers 102. Environment 100 is show to include client devices 104, 106, 108, and 110, and a server device 112. Components 104-112 are interconnected via link 114.

Link 114 represents generally any infrastructure or combination of infrastructures configured to enable an electronic connection, wireless connection, or other connection to enable data communication between components 104-112. Such infrastructure or infrastructures may include, but are not limited to, one or more of a cable, wireless, fiber optic, or remote connections via telecommunication link, an infrared link, or a radio frequency link. For example, link 114 may represent the internet, one or more intranets, and any intermediate routers, switches, and other interfaces. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 104-110 represent generally any computing device with which a user may interact to communicate with other client devices and server device 112 via link 114. Server device 112 represents generally any computing device configured to serve an application and corresponding data for consumption by client devices 104-110.

Client device 104 is shown to include core device components 116. Core device components 116 represent generally the hardware and programming for providing the computing functions for which device 104 is designed. Such hardware can include a processor and memory, a display apparatus 118, and a user interface 120. The programming can include an operating system and applications. Display apparatus 118 represents generally any combination of hardware and programming configured to exhibit or present a message, image, view, or other presentation for perception by a user, and can include, but is not limited to, a visual, tactile or auditory display. In examples, the display device may be or include a monitor, a touchscreen, a projection device, a touch/sensory display device, or a speaker. User interface 120 represents generally any combination of hardware and programming configured to enable interaction between a user and user client device 104 such that the user may effect operation or control of user client device 104. In examples user interface 120 may be, or include, a keyboard, keypad, or a mouse. In some examples, the functionality of display apparatus 118 and user interface 120 may be combined, as in the case of a touchscreen apparatus that may enable presentation of images at user client device 104, and that also may enable a user to operate or control functionality of user client device 104.

System 102, discussed in more detail below, represents generally a combination of hardware and programming configured to enable the display of communication explanations using record-relevancy tiers. System 102 is to receive communication data 122 indicative or suggestive of a word or phrase communicated during a meeting attended by or involving a plurality of participants. As used herein a "communication" refers generally to a word or phrase that is shared or expressed by a human participant during a meeting. As used herein a "word" refers generally to a meaningful element of speech or writing, typically to communicate a thought or concept. A "phrase" refers generally to a string or group of words that function as a unit or constituent to convey a thought or concept. A "meeting" refers generally to any assembly of or coming together of two or more participants in which such participants communicate. As used herein, a "participant" refers generally to a human taking part or joining in the meeting. In examples, a meeting may be an in-person assembly or conference of participants, a telephonic call or conference (e.g., via telephone connection, a voice-over-IP connection, or video conference, or otherwise). In an example meeting, some participants may attend in-person, and others may attend by various electronic means such as a telephone call, conference call, or video-conference call. Communication among participants at a meeting may be, but not is limited to, via speech, instant-message, or any other communication means.

System 102 is to, for each participant, identify records electronically accessible to the participant, and associate each record with a tier from a hierarchy of record-relevancy tiers. As used herein, a "record" refers generally to a document, database, or another electronic collection of data that provides information or evidence. In examples, a record may include, but is not limited to, text, images, multimedia, or other data. Each tier of the hierarchy is indicative or suggestive of a relevance of a particular record-relevancy to the meeting. As used herein, a "tier" refers generally to a level or row of a hierarchy. In an example, the hierarchy may be visually represented as a pyramid or other hierarchical structure, with the hierarchy including a series of tiers situated one above the other and successively receding or diminishing in size. A "record type" refers generally to a set of or records of a common type. A "record-relevancy tier" refers generally to a tier indicative or suggestive of a record or record type's relevance to a meeting compared with the relevance of other records or record types as indicated by other tiers of the hierarchy. In an example, each tier may be indicative or suggestive of a relevancy of a record or record type to a meeting according to a subject of the meeting. In another example, the each tier may be indicative or suggestive of a relevancy of a record or record type to a meeting according to a list of participants attending the meeting. In an example the identification of records and/or the association of records may take place in advance of the actual meeting, based upon received data indicative or suggestive of the subject of the meeting or data that identifies the meeting's participants. In another example the identification of records and/or the association of records may be triggered by the start of the meeting.

System 102 is to identify a set of explanations for the word or phrase communication and to identify an associated score for each explanation. The identifying of explanations and scores may include, for each participant, beginning with a most relevant tier from hierarchy, searching records accessible to that participant tier by tier until an explanation for the communication is identified. As used herein, an "explanation" refers generally to a definition, description, statement, image, or other material that can be displayed to a meeting participant to clarify a communication from the meeting.

The identifying of explanations and scores for that participant may include, assigning a score to the explanation according to the tier associated with the record in which the explanation is found. As used herein, a "score" refers generally to a rating or a grade, including but not limited to a numerical or alphabetical score. For instance, a score of "1" on a scale of "1 to 10" may indicates a highest relevance to the meeting, or a score of "A" on a scale of "A-J" may indicate a highest relevance to the meeting. System 102 is to then determine, based upon the scores for the set of explanations, a preferred explanation, and to cause a display of the preferred explanation.

System 102 may be wholly integrated within core device components 116. System 102 may be implemented as a component of server device 112 where it takes action based in part on data received from core device components 116 via link 114. System 102 may be distributed across client device 104 and server device 112. For example, obtaining of communication data, identification of records electronically accessible participants, to the participant, and association of records with tiers of a hierarchy of record-relevancy tiers may be performed on client device 104, while identifying a set of explanations for the communication and associated scores and causing a display of a preferred explanation for the communication determined based upon the scores may be performed by server device 112. Other distributions of system 102 across client device 104 and server device 112 are possible and contemplated by this disclosure. It is noted that all or portions of the system for determining preferred communication explanations using record-relevancy tiers 102 may also be included on client devices 106, 108 or 110.

Components

Figure 2:
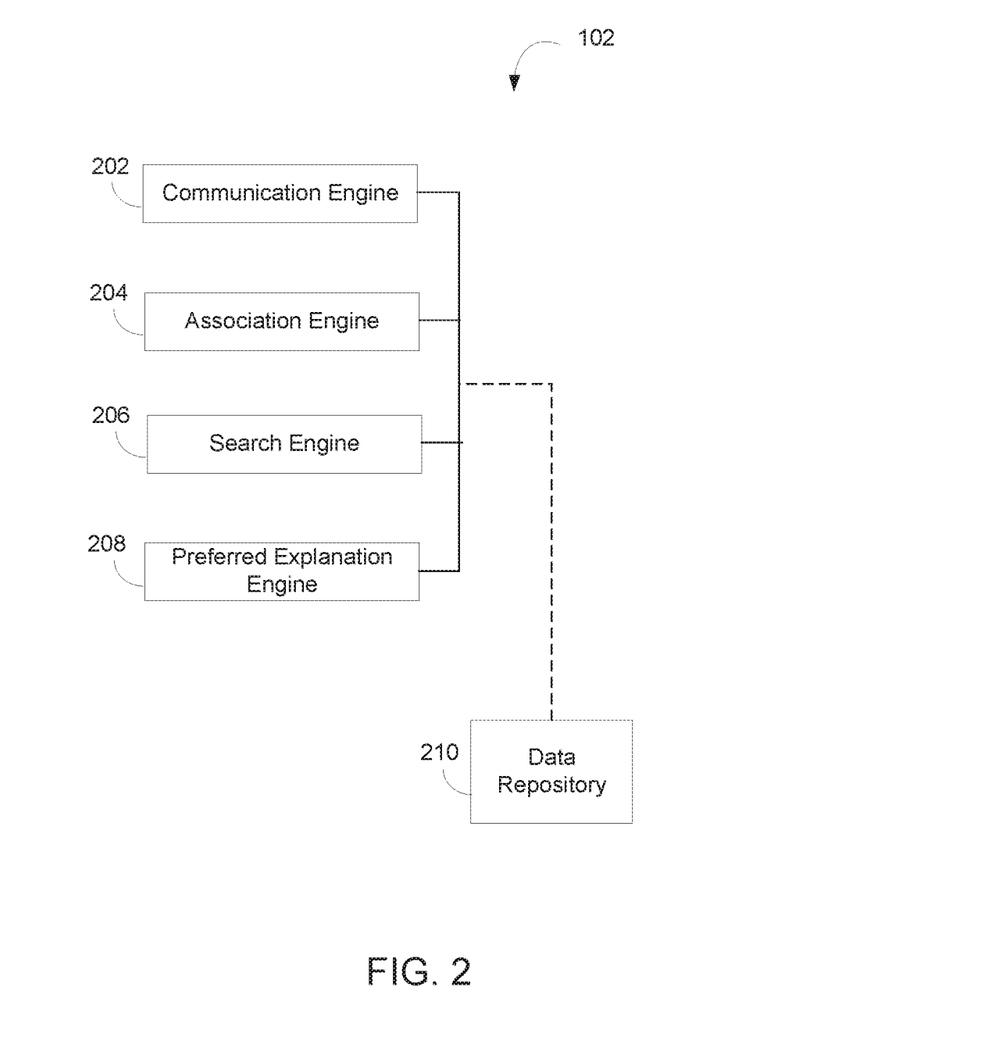
FIG. 2 is a block diagram depicting an example of a system to determine preferred communication explanations using record-relevancy tiers.
Figure 3:
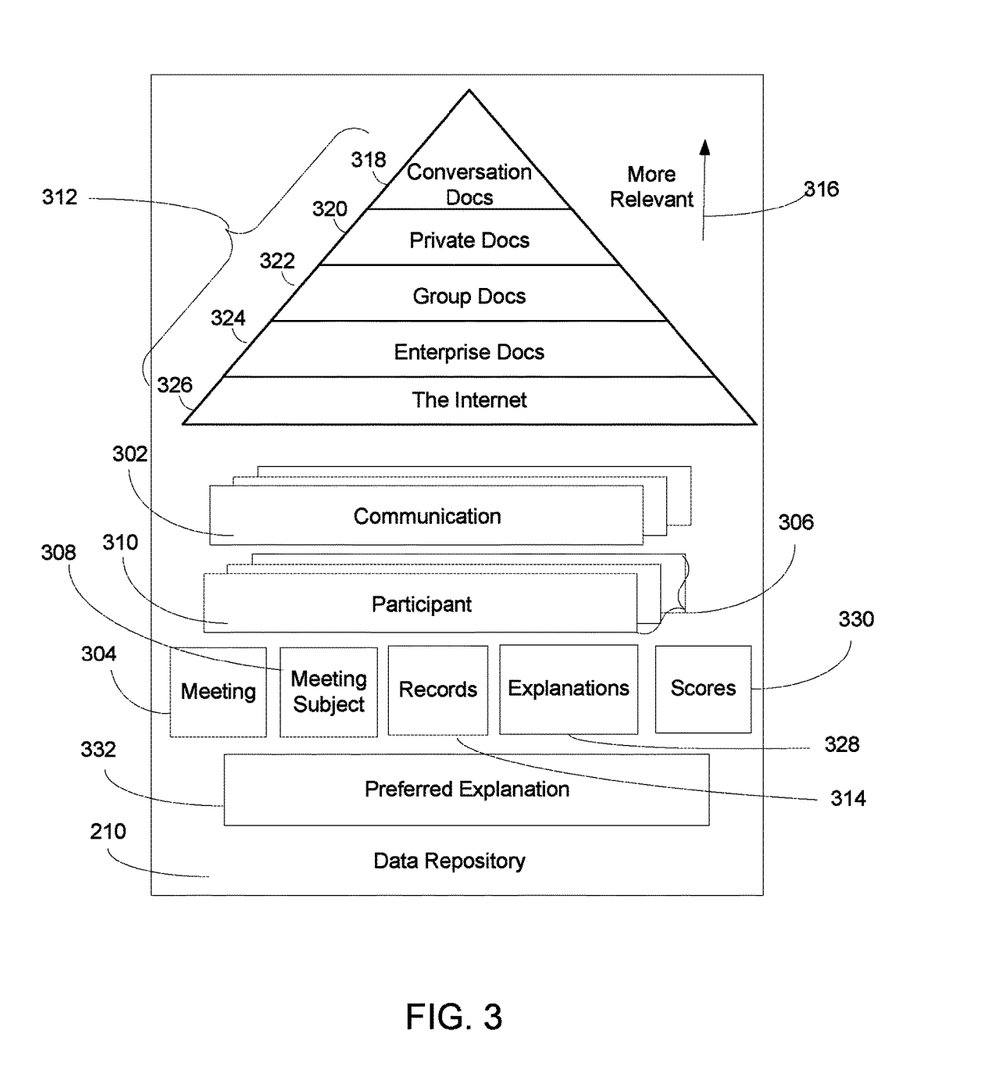
FIG. 3 is a block diagram depicting an example data structure for a system to determine preferred communication explanations using record-relevancy tiers.
Figure 4:
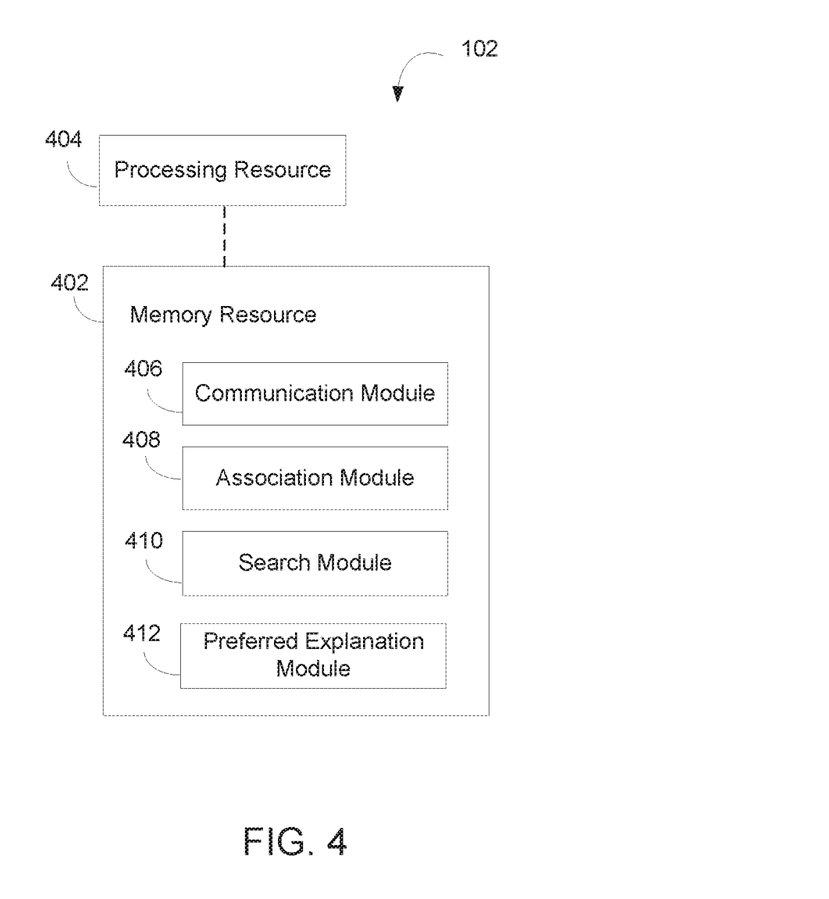
FIG. 4 is a block diagram depicting a memory resource and a processing resource according to an example.

FIGS. 2-4 depict examples of physical and logical components for implementing various embodiments. In FIG. 2 various components are identified as engines 202, 204, 206, 208. In describing engines 202, 204, 206, 208 focus is on each engine's designated function. However, the term engine, as used herein, refers generally to a combination of hardware and programming configured to perform a designated function. As is illustrated later with respect to FIG. 4, the hardware of each engine, for example, may include one or both of a processor and a memory, while the programming may be code stored on that memory and executable by the processor to perform the designated function.

FIG. 2 is a block diagram depicting components of a system for determining preferred communication explanations using record-relevancy tiers 102. In this example, system 102 includes communication engine 202, association engine 204, search engine 206, and preferred explanation engine 208. In performing their respective functions, engines 202, 204, 206, 208 may access data repository 210. Repository 210 represents generally any memory accessible to system 102 that can be used to store and retrieve data.

Communication engine 202 represents a combination of hardware and programming configured to receive data indicative of a word or phrase communicated during a meeting attended by a plurality of participants. In an example, the word or phrase that was communicated during the meeting is a verbal communication, and communication engine 202 includes instructions to transcribe the verbally expressed communication to a text form.

In an example, communication engine 202 may receive the data indicative of the communicated word or phrase by actively recording the communication. In an example, receiving the data may include receiving audio data that is a recording of a meeting dialogue recorded using an audio-capture device that records the dialogue as a WAV, MP3, PCM, BWF, or other digital audio file format. In another example, receiving the data may include receiving audio/video data that is a recording of a meeting dialogue recorded using a digital video recording device. In an example, the data may be received in the form of a MPEG-1, MPEG-2, MP3, AVI, WMV, or other digital video file. In an example, communication engine 202 may include an audio or video recording device. In another example, communication engine 202 may obtain the data from an audio or video recording device, a storage device, or from another computing device.

In another example, the data that is received by communication engine 202 may be received in text form. For instance, if the meeting between participants is being held via an online chat application or service, such as Google Chat™, Lync®, or Sametime®, the communication may have been expressed by a participant via a text entry to the application or service, and the data indicative of the communication is received at communication engine 202 in the same text format.

Association engine 204 represents a combination of hardware and programming configured to, for at least subset of the set of participants to the meeting, identify a group of records that are electronically accessible to the participant, and associate each record from the group with a record-relevancy tier from a hierarchy of record-relevancy tiers Each tier with the hierarchy is indicative of a record or record-type relevance to the meeting.

Search engine 206 represents a combination of hardware and programming configured to identify a plurality of explanations for the communication, and to identify for each such explanation an associated score. Identifying the plurality of explanations and associated scores includes, for each participant, searching records accessible to that participant tier by tier, beginning with the most relevant tier among the hierarchy, until an explanation is identified. As used herein, to search "tier by tier" refers generally to searching tiers of a hierarchy in an order of gradation or ranking, e.g., in an order of relevancy ranking. After identification of the explanation, search engine 206 scores the explanation according to the tier associated with the record in which the explanation is identified.

Preferred explanation engine 208 represents a combination of hardware and programming configured to determine, based upon the scores for the explanations, a preferred explanation, and to cause a display of the preferred explanation for viewing by one or more of the meeting participants. As used herein, a "display" refers generally to an exhibition or presentation for perception by a participant. In an example, the display is or includes a graphic user interface display to be presented at a computer monitor, touchscreen, or other electronic display device. In an example, preferred explanation engine 208 includes the display device. In another example, preferred explanation engine 208 is to cause the display by sending the preferred explanation along with instructions for display to a display device that is electronically or wirelessly connected to system 102.

In an example, association engine 204 may be configured to access a database, listing, table or other registry to determine a set of stop words. As used herein, a "stop word" refers to a specific word, or specific phrase, which is to be filtered out prior to, or after, a search of records to identify an explanation for a word or phrase. In different situations, any group of words can be chosen as the stop words for a given purpose. In an example, stop words to be determined may include common, short function words, such as "the", "is", "at", "which", and so on. In an example, after the identification of the set of stop words, association engine 204 confirms via the registry that the communication is not a stop word. After such confirmation, search engine 206 proceeds to search participant records for an explanation for the communication.

In another example, association engine 204 may be configured to, when identifying records electronically accessible to a participant, filter or ignore participant records that are not accessible to all of the participants. In yet another example, the search engine 206, when searching records to identify an explanation for a communication, may filter or ignore data from a record that is not accessible to all of the participants. In both examples set forth in this paragraph, a security factor is presented such that, if a preferred explanation is displayed for viewing by multiple participants of the meeting, no participant is exposed to information not already electronically available to that participant.

FIG. 3 depicts an example implementation of data repository 210. In this example, repository 210 includes data suggestive of a communication 302, a meeting 304, a set of meeting participants 306, a subject 308 of a meeting, a hierarchy of record-relevancy tiers 312, records 314, a set of explanations 328 for a communication, explanation scores 330, and a preferred explanation 332. Referring back to FIG. 2 in view of FIG. 3, in an example, communication engine 202 (FIG. 2) obtains data suggestive of a word or phrase communication 302 expressed during a meeting 304 including a set of meeting participants 306. Communication engine 202 may also receive data suggestive of a subject 308 of the meeting. In an example, the number of members of the set of participants 306 is the same as the total number of participants for the meeting. In another example, the number of participants in the set 306 may be less than total number of participants for the meeting.

Continuing with the example of FIG. 3 association engine 204 (FIG. 2), for each participant (individually a "subject participant" 310) within the set 306, identifies records 314 that are electronically accessible to the subject participant 310 and associates each identified record 314 with a tier from a hierarchy of record-relevancy tiers 312. In an example, system 102 may make tier associations utilizing assessments of record-relevancy relevancy to the meeting according to a subject 308 of the meeting as indicated by meeting data 304. In another example, system 102 may make tier associations utilizing assessments of record-relevancy relevancy to the meeting 304 according to a list of participants attending the meeting, e.g., a list of participants as indicated by the participant set 306.

Each record-relevancy tier 312 of the hierarchy is suggestive of a relevance 316 to the meeting 304. In the example of FIG. 3, the hierarchy is visually presented as a pyramid of five record-set tiers, including a "Conversation Documents" Tier 1 318, a "Private Documents" Tier 2 320, a "Group Documents" Tier 3 322, an "Enterprise Documents" Tier 4 324, and an "Internet" Tier 5 326. In this example, the record-relevancy tiers to be associated with the records 308 are selected from the set of Tiers 1 through 5, with Tier 1 being most the most relevant to the meeting 304, and with Tier 5 being least relevant to the meeting.

In the example of FIG. 3, "Conversation Documents" Tier 1 318 is a record-relevancy tier that describes records or a record type directly related to the meeting or the subject of the meeting. Records associated with Tier 1 are records determined to be of the highest relevance to the meeting. In an example, records that are emails, instant messages, or other records of communications between the participants of the meeting, as indicated by the participant set 306, may be associated with Tier 1. In another example, email records that have a subject line that is the same or substantially similar to the subject of the meeting may be associated with Tier 1.

Continuing with the example of FIG. 3, "Private Documents" Tier 2 320 is a record-relevancy tier that describes records or a record type stored in a memory dedicated to use by a subject participant. In an example, records associated with Tier 2 are of lesser relevance to the meeting than records associated with Tier 1. In an example, documents, application files, image files, and other records that are restricted to use by a subject participant whose records are being examined may be associated with the Tier 2 record-relevancy.

Continuing with the example of FIG. 3, "Group Documents" Tier 3 322 is a record-relevancy tier that describes records or a record type accessible to a work team that includes the set 306 of participants. Records associated with Tier 3 are of lesser relevance to the meeting than records associated with Tiers 1 or 2. In an example, documents, application files, or other records that are shared between a work team may be associated with Tier 3. "Enterprise Documents" Tier 4 324 is a record-relevancy tier that describes records or a record type accessible to an enterprise user group that includes the set 306 of participants, wherein the work team is a subset of the enterprise group. Records associated with Tier 4 are of lesser relevance to the meeting than records associated with any of Tiers 1 through 3. In an example, documents, application files, or other records that are shared throughout an organization, enterprise, or entity may be associated with Tier 3, In this example, "Internet Documents" Tier 5 326 is a record-relevancy tier that describes records or a record type that are accessible via public internet. Records associated with Tier 5 are of lesser relevance to the meeting than records associated with any of Tiers 1 through 4.

Continuing with the example of FIG. 3, search engine 206 (FIG. 2) identifies a set of explanations 328 for the communication 302 and an associated score 330 for each of the explanations. The identifying, includes for each participant, beginning with the most relevant "Conversation Documents" Tier 1 and searching the records accessible to the subject participant tier by tier through Tiers 1 through 5 until an explanation is identified. Responsive to identification of an explanation, search engine 206 assigns a score to the explanation according to the tier associated with the record in which the explanation is found.

In a particular example, search engine 206 when searching records 314 accessible to a subject participant tier by tier may, after finding an explanation within a subject tier, continue searching that tier for additional explanations, without proceeding to a next most relevant tier, and present multiple preferred explanations for the communication derived from that subject tier.

In another particular example, search engine 206 when searching records 314 accessible to a subject participant tier by tier may, after finding an explanation within a subject tier, discontinue all further searching in that tier and not proceed to a next most relevant tier. In this example, search engine 206 may thus present a single preferred explanation for the communication derived from that subject tier.

Continuing with the example of FIG. 3, preferred explanation engine 208 (FIG. 2) determines, based upon the assigned scores 330, a preferred explanation 332, and causes a display of the communication 302 and the preferred explanation 332. In examples, the preferred explanation 332 may be caused to be displayed to each of the set of participants 306, to a number of participants that is less than each of the set of participants, or to all participants of the meeting.

In the foregoing discussion, engines 202, 204, 206, 208 were described as combinations of hardware and programming. Engines 202, 204, 206, 208 may be implemented in a number of fashions. Looking at FIG. 4, the programming may be processor executable instructions stored on a tangible memory resource 402 and the hardware may include a processing resource 404 for executing those instructions. Thus memory resource 402 can be said to store program instructions that when executed by processing resource 404 implement system 102 of FIGS. 1 and 2.

Memory resource 402 represents generally any number of memory components capable of storing instructions that can be executed by processing resource 404. Memory resource 402 is non-transitory in the sense that it does not encompass a transitory signal but instead is made up of one or more memory components configured to store the relevant instructions. Memory resource 402 may be implemented in a single device or distributed across devices. Likewise, processing resource 404 represents any number of processors capable of executing instructions stored by memory resource 402. Processing resource 404 may be integrated in a single device or distributed across devices. Further, memory resource 402 may be fully or partially integrated in the same device as processing resource 404, or it may be separate but accessible to that device and processing resource 404.

In one example, the program instructions can be part of an installation package that when installed can be executed by processing resource 404 to implement system 102. In this case, memory resource 402 may be a portable medium such as a CD, DVD, or flash drive or a memory maintained by a server from which the installation package can be downloaded and installed. In another example, the program instructions may be part of an application or applications already installed. Here, memory resource 402 can include integrated memory such as a hard drive, solid state drive, or the like.

In FIG. 4, the executable program instructions stored in memory resource 402 are depicted as a communication module 406, an association module 408, a search module 410, and a preferred explanation module 412. Communication module 406 represents program instructions that when executed may cause processing resource 404 to cause the implementation of communication engine 202 of FIG. 2. Association module 408 represents program instructions that when executed cause processing resource 404 to cause the implementation of association engine 204 of FIG. 2. Search module 410 represents program instructions that when executed cause processing resource 404 to cause the implementation of search engine 206 of FIG. 2. Preferred explanation module 412 represents program instructions that when executed cause processing resource 404 to cause the implementation of preferred explanation engine 208 of FIG. 2.

Figure 5:
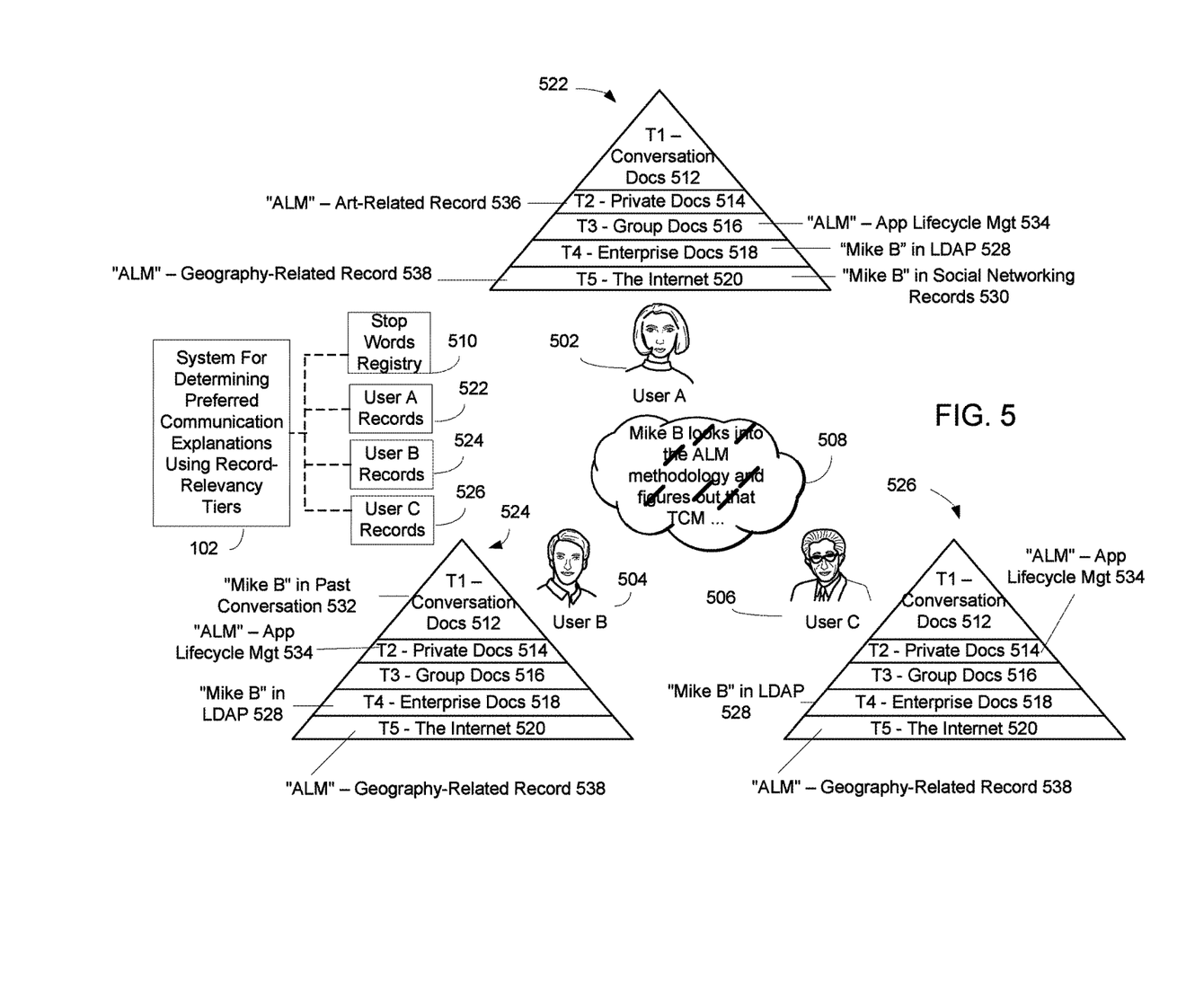
FIG. 5 illustrates an example of determining preferred communication explanations using record-relevancy tiers.
Figure 6:
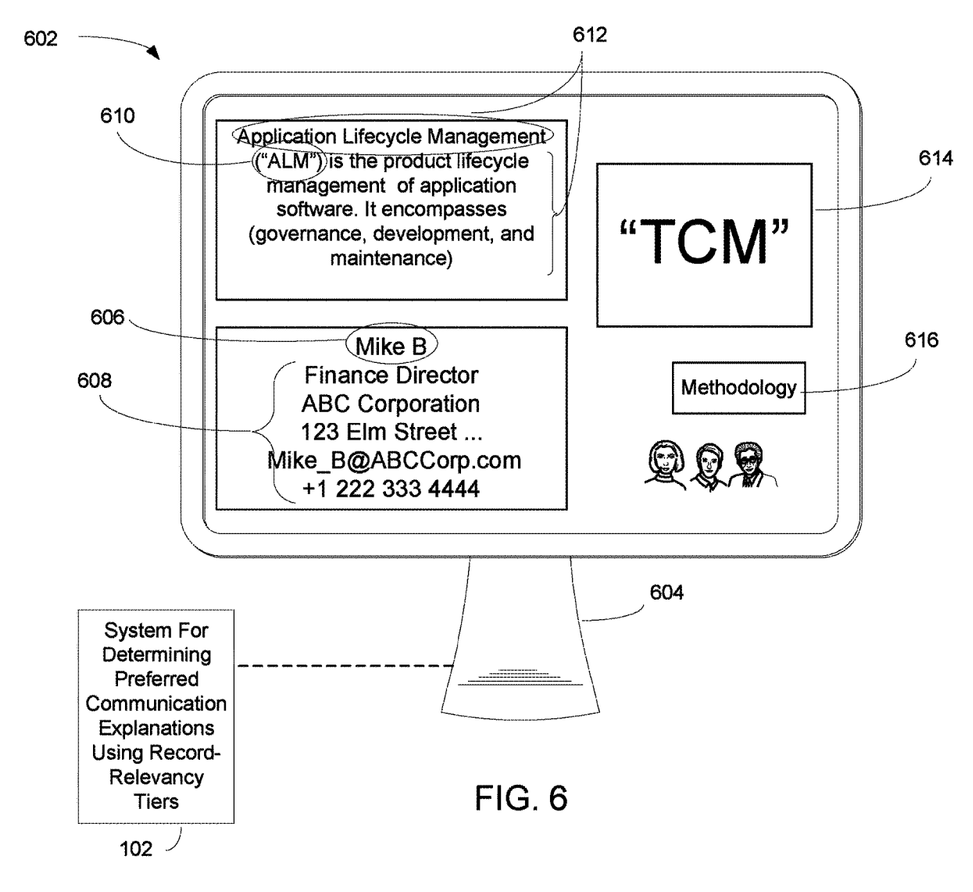
FIG. 6 depicts an example of displaying preferred communication explanations determined using record-relevancy tiers.

FIGS. 5 and 6 illustrate examples of determining preferred communication explanations using record-relevancy tiers. Turning to FIG. 5, in an example system 102 receives communication data indicative of words and phrases communicated during a meeting attended by three participants—User A 502, User B 504, and User C 506. The communication data includes the following verbal communication 508 from the meeting "Mike B looks into the ALM methodology and figures out that TCM . . . ." System 102 transcribes the verbal communication to a text form. System 102 accesses a database, registry or other memory element to determine a set of stop words, and then word by word compares words or phrases from the verbal communication to confirm the words or phrases are not stop words. In this example, system 102 compares each of the words of the expressed sentence to the registry of stop words, and filters out stop words "looks into", "the", "and", and "figures out." System 102 thus confirms, via the stop words registry, that the communications "Mike B", "ALM" and "methodology" are not stop words.

Continuing with the example of FIG. 5, system 102 performs a records to tiers association task for each of User A 502, User B 504, and User C 506. System 102, for each of User A, User B, and User C, identifies records electronically accessible to that participant, and associates each record with a record-relevancy tier from a hierarchy of record-relevancy tiers. In this example, the hierarchy of record-relevancy tiers includes a "Conversation Documents" Tier 1 512 (a tier to be associated with records or a record type directly related to the meeting or the subject of the meeting), a "Private Documents" Tier 2 514 (a tier to be associated with records or a record type stored in a memory dedicated to use by the subject participant), a "Group Documents" Tier 3 516 (a tier to be associated with records or a record type accessible to a work team that includes Users A, B, and C), an "Enterprise Documents" Tier 4 518 (a tier to be associated with records or a record type accessible to an enterprise user group that includes Users A, B, and C), and an "Internet Documents" Tier 5 520 (a tier to be associated with records or a record type that is/are accessible via a public internet). Tier 1 is the record-relevancy tier most relevant to the meeting involving Users A, B, and C, followed in order of relevancy by Tiers 3-5, with Tier 5 being least relevant to the meeting. The work team with access to "Group Documents" Tier 3 is a subset of the entity group with access to "Enterprise Documents" Tier 4.

Continuing with the example of FIG. 5, system 102 (FIG. 2) identifies, for each of the communications "Mike B" and "ALM", a plurality of explanations for the communication and for each explanation an associated score. Looking first at the communication "Mike B", system 102 searches each participant's records (the records 522 accessible to User A, then records 524 accessible to User B, and then records 526 accessible to User C) tier by tier, beginning with the most relevant Tier 1 "Conversation Documents", for an explanation for the communication "Mike B", until an explanation is identified for records accessible to that subject participant.

In this example, system 102 searches the records accessible to User A by tiers, and finds the communication "Mike B" in a Lightweight Directory Access Protocol ("LDAP") database 528 that system 102 associated with Tier 4 "Enterprise Documents" 518. In a first example scoring system, an explanation found in Tier 1 receives a score of "5", an explanation found in Tier 2 receives a score of "4", an explanation found in Tier 3 receives a score of "3", an explanation found in Tier 4 receives a score of "2" and an explanation found in Tier 5 receives a score of "1". Utilizing this first example scoring system, after identifying the explanation for "Mike B" in User A's LDAP record associated with the Tier 4 Enterprise Documents, system 102 assigns a score of "4" to this explanation. In this example, the communication "Mike B" might also have been found in social networking records 530 accessible to User A and that system 102 assigned to Tier 5 "The Internet" 520. As the "Mike B" communication was found in a LDAP 528 associated with Tier 4 "Enterprise Documents" 518, in this example system 102 stopped the search for an explanation for "Mike B" at Tier 4 and did not return or use the social networking explanation 530 associated with Tier 520.

Continuing with the communication "Mike B", system 102 also searches, tier by tier, the records 524 accessible to User B, and finds the communication "Mike B" in a past conversation email record 532 that system 102 associated with Tier 1 "Conversation Documents" 512. Utilizing the first example scoring system, system 102, after identifying the explanation for "Mike B" in User B's past conversation email record associated with the Tier 1 Conversation Documents, assigns a score of "5" to this explanation. In this example, the communication "Mike B" might also have been found in User B's records in the LDAP record 528 that is accessible to User B 504 and that system 102 assigned to Tier 4 "Enterprise Documents" 518. As the "Mike B" communication was found in a record associated with Tier 1 "Conversation Documents" 512, system 102 stopped the search of records accessible to User B at Tier 1 and did not return or use the LDAP explanation associated with Tier 4.

Continuing with the communication "Mike B", system 102 also searches, tier by tier, the records 526 accessible to User C, and finds the communication "Mike B" in a LOAF record 528 that system 102 associated with Tier 4 "Enterprise Documents" 518 Utilizing the first example scoring system, system 102, after identifying the explanation for "Mike B" in the LDAP 528 that is electronically accessible to User C and is associated with Tier 4 "Enterprise Documents", assigns a score of "2" to this explanation.

System 102 determines, based upon the scores for the explanations for communication "Mike B" found in the records 522 524 526 accessible to users A, B, and C, a preferred explanation. In this example, the preferred explanation is the LDAP explanation 528 that was found in both the User A accessible records and the User C accessible records assigned to the Tier 4 "Enterprise Documents", based upon a first example algorithm that chooses the explanation that has the most repeated score (here the LOAF explanation 528 with two scores of "2" versus User B's past conversation explanation with a score of "5") as between Users A, B, and C.

Utilizing an alternative second example algorithm, the preferred explanation could have been the past conversation email explanation 532 that was found in the records 524 accessible to User B and assigned to the Tier 1 "Conversation Documents". In an example, the second example algorithm chooses the highest scored explanation (the past conversation email explanation 532 with a score of "5") considering the records 522 524 526 accessible to Users A, B, and C.

In a particular example in which the communication "Mike B" was expressed by each of Users A, B, and C during the meeting, system 102 may determine an order in which the participants communicated "Mike B" to determine that User A was the first to say the word. In this example, applying the logic that records of the participant that was the first to say the word should have the highest priority, system 102 may apply an adjustment factor when assigning the score to the "ALM" explanation identified from the User B's LOAF records, the adjusted score indicating a higher level of relevance to the meeting.

Looking next at the communication "ALM", system 102 identifies a set of explanations for the "ALM" communication and associated scores for each explanation, including performing a search routine for the records 522 524 526 accessible to Users A, B, and C. The routine is to search records accessible to each of users A, B and C tier by tier, beginning the most relevant Tier 1 "Conversation Documents" 512 until an explanation for "ALM" is identified. Each identified explanation for the "ALM" communication is assigned a score to the "ALM" explanation according to the tier associated with the record in which the "ALM" explanation is found.

In the example of FIG. 5, we can assume that system 102 determined an "Application Lifecycle Management" 534 preferred explanation for the communication "ALM". The "Application Lifecycle Management" explanation was found in a record 522 accessible to User A and in a record 524 accessible to User B, with both records assigned to Tier 3 "Group Documents." The "ALM" communication was also found in a record 526 accessible to User C assigned to Tier 2 "Private Documents," In this example, a "Application Lifecycle Management" 534 preferred explanation was determined utilizing an algorithm that considered as factors a score assigned to the "Application Lifecycle Management" explanation found in the records 522 accessible to User A, B, and C, a score assigned to an arts-related explanation 536 for "ALM" found in the records accessible to User A associated with Tier 2 "Private Documents" 514, and scores assigned to a geography-related explanation 538 for "ALM" found in records 522 524 526 that are accessible to Users A, B, and C and that are publicly available records associated with Tier 5 "The Internet."

Turning to FIG. 6, in view of FIG. 5, after determination of the preferred explanation for the communication "Mike B" system 102 causes a display 602 at a display device 604 of the "Mike B" 606 communication and a preferred explanation 608 for "Mike B". In this example, the preferred explanation for "Mike B" includes name, title, address, email, and telephone number information relating to "Mike B", with such information having its origin in the LOAF 528 (FIG. 5) that was accessible to all of Users A, B, and C.

After determination of the preferred explanation for the communication "ALM" system 102 causes the display 602 to include the "ALM" 610 communication and a preferred explanation 612 for "ALM". In this example, the preferred explanation 612 for "ALM" includes a definition for "Application Lifecycle Management" with such information having its origin in the Application Lifecycle Management record 534 (FIG. 5) that was accessible to each of Users A, B, and C. In this example, the display 102 additionally includes preferred explanations for other words expressed in the meeting, i.e., "TCM" 614 and "Methodology" 616.

In an example, the preferred explanations for a communication, e.g., "TCM" 614 or "Methodology" 616 in FIG. 6, may be presented in conjunction with the communication as a result of a user interaction with the display 602 (e.g., a mouseclick interaction, a mouse hover interaction, or an interaction of a finger touching a touchscreen display), to cause the preferred explanation to appear in conjunction with the communication.

In an example, the display 602 may be a display to be presented at display device 604 for viewing by a single participant, e.g., User B 504 (FIG. 5). In another example, the display 602 including the "Mike B", "ALM", "TCM", and "methodology" communications and their preferred explanations may be for presentation to each of the participants User A, User B, and User C.

In the example of FIG. 6, the display 602 includes a set of communications for which preferred explanations have been determined ("Mike B" 606, "ALM" 610, "TCM" 614, and "Methodology" 616). In this example, system 102, responsive to determining that the "TCM" preferred explanation among the set was identified in a more relevant tier than the other explanations, causes display of the "TCM" preferred explanation and/or its associated communication in a manner that ranks the "TCM" preferred explanation more highly than the other preferred explanations. In this example, ranking the TCM explanation more highly than the other explanations includes displaying the TCM communication 614 in a larger size or font than the other communications or their respective preferred explanations. In another example, ranking the TCM explanation more highly than the other explanations may include displaying the preferred explanation for the TCM communication 614 in a larger size or font than the other communications or their respective preferred explanations. In another example, ranking the "TCM" preferred explanation more highly than the other explanations may include displaying the "TCM" communication 614 or its associated preferred explanation in a more central location within the display than other communications or preferred explanations.

In an example, system 102 enables any of Users A, B, or C 502 504 506 to interact with the display 102. In an example, the interaction may be via a mouse movement, touch at a touchscreen, or other user interface action to manipulate or otherwise interact with a communication or preferred explanation included as a GUI within the display 102. Responsive to detection of the interaction, system 102 may enable a participant to interact with the display 102 to cause the preferred explanation 612 for the communication "ALM" 610, which was at that point ranked lower than the preferred explanation for the communication "TCM" 614, to now be ranked more highly than the "TCM" preferred explanation. In an example, this reranking may be accomplished through an adjustment to the scorings previously discussed herein. In another example, this reranking may be accomplished through an adjustment to the size or location of the displayed "ALM" communication and/or explanation relative to the other communications or their associated preferred explanations.

Operation

Figure 7:
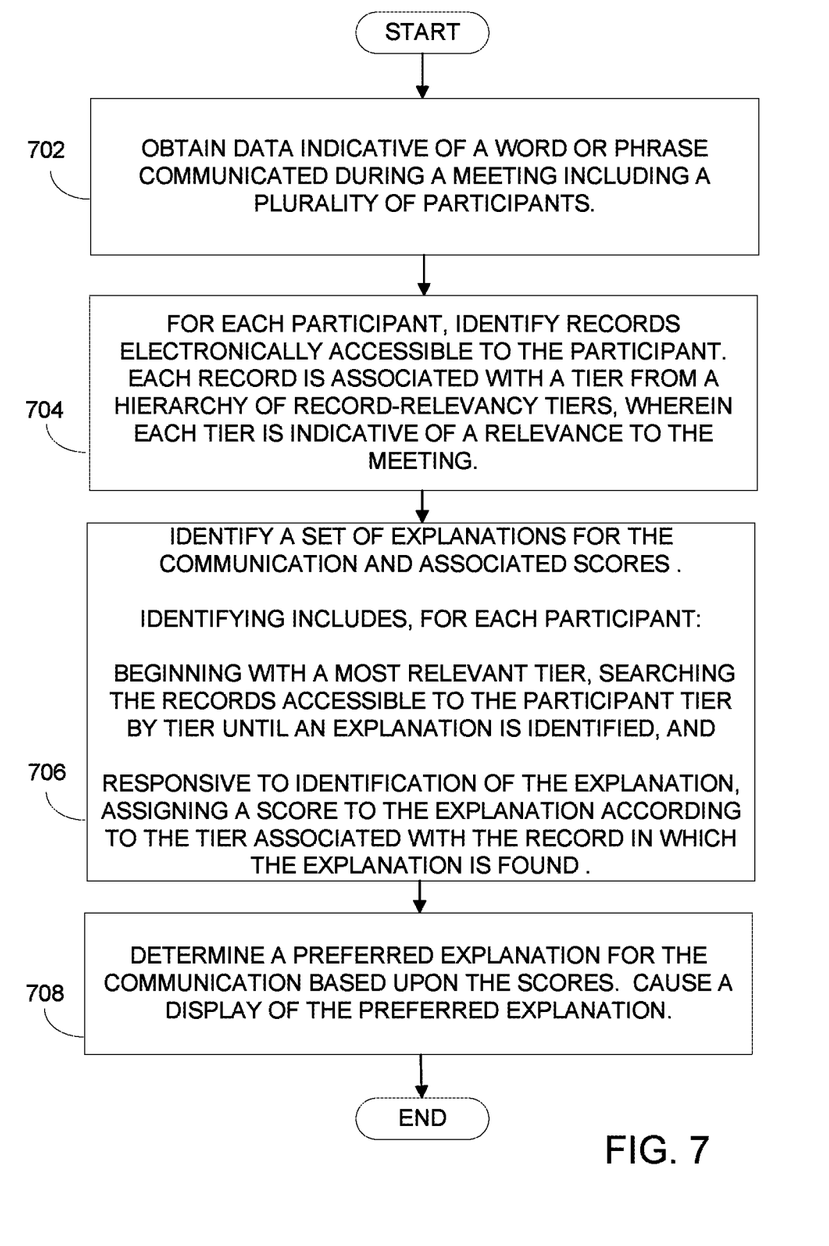
FIG. 7 is a flow diagram depicting steps taken to implement an example.

FIG. 7 is a flow diagram of steps taken to implement a method for determining preferred communication explanations using record-relevancy tiers. In discussing FIG. 7, reference may be made to the components depicted in FIGS. 2 and 4. Such reference is made to provide contextual examples and not to limit the manner in which the method depicted by FIG. 7 may be implemented. Data is obtained. The data is indicative of a word or phrase communicated during a meeting including a plurality of participants (block 702). Referring back to FIGS. 2 and 4, communication engine 202 (FIG. 2) or communication module 406, when executed by processing resource 404, may be responsible for implementing block 702.

For each participant, records electronically accessible to the participant are identified. Each record is associated with a tier from a hierarchy of record-relevancy tiers, wherein each tier is indicative of a relevance to the meeting (block 704). Referring back to FIGS. 2 and 4, association engine 204 (FIG. 2) or association module 408, when executed by processing resource 404, may be responsible for implementing block 704.

A set of explanations for the communication and associated scores are identified. Identifying includes, for each participant, beginning with a most relevant tier, searching the records accessible to the participant tier by tier until an explanation is identified. Identifying includes, for each participant, responsive to identification of the explanation, assigning a score to the explanation according to the tier associated with the record in which the explanation is found (block 706). Referring back to FIGS. 2 and 4, search engine 206 (FIG. 2) or search module 410, when executed by processing resource 404, may be responsible for implementing block 706.

A preferred explanation for the communication is determined based upon the scores. A display of the preferred explanation is caused (block 708). Referring back to FIGS. 2 and 4, preferred explanation engine 208 (FIG. 2) or preferred explanation module 412, when executed by processing resource 404, may be responsible for implementing block 708.

FIGS. 1-7 aid in depicting the architecture, functionality, and operation of various embodiments. In particular, FIGS. 1-4 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s). Embodiments can be realized in any memory resource for use by or in connection with a processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 7 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A computer program product embodied as instructions stored in a non-transitory computer readable medium that when executed by a processor cause the processor to:
   obtain data indicative of a word or phrase communicated during a meeting including a plurality of participants;
   for each participant, identify records electronically accessible to the participant, and associate each record with a tier from a hierarchy of record-relevancy tiers, wherein each tier is indicative of a relevance to the meeting;

identify a set of explanations for the communication and associated scores, including for each participant, beginning with a most relevant tier, search the records accessible to the participant tier by tier until an explanation is identified, and responsive to identification of the explanation assign a score to the explanation according to the tier associated with the record in which the explanation is found; and determine a preferred explanation for the communication based upon the scores, and to cause a display of the preferred explanation.

2. The computer program product of claim 1, wherein communication of the word or phrase is a verbal communication, and wherein the instructions are to cause the processor to transcribe the communication to text form.

3. The computer program product of claim 1, wherein the instructions are to cause the processor to access a registry to determine a set of stop words, and prior to searching records for an explanation, confirm via the registry that the communication is not a stop word.

4. The computer program product of claim 1, wherein the instructions are to cause the processor to, when identifying records electronically accessible to a participant, filter or ignore records that are not accessible to all of the participants; or when searching records to identify an explanation, filter or ignore data from a record that is not accessible to all of the participants.

5. The computer program product of claim 1, wherein the instructions are to cause the processor to, when searching records accessible to a participant tier by tier, after finding an explanation within a first tier, continue searching that tier for additional explanations, without proceeding to a next most relevant tier, and present multiple preferred explanations for the communication derived from that first tier.

6. The computer program product of claim 1, wherein the associated tiers are selected from a set of tiers 1 through tier N, with tier 1 being most relevant and tier N being least relevant to the meeting, and wherein the tiers 1 through N include, in order of relevance to the meeting, a first tier describing records directly related to the meeting or the subject of the meeting, a second tier describing records stored in a memory dedicated to use by a first participant, and a third tier describing records accessible to a group that includes the participants.

7. The computer program product of claim 6, wherein the group is a first group, and wherein the first group is a subset of a second group, and wherein the tiers 1-N include a fourth tier, of lesser relevance to the meeting than the first through third tiers, describing records accessible to the second group.

8. The computer program product of claim 6, wherein the tiers 1 through tier N include a fourth tier, of lesser relevance to the meeting than the first through third tiers, describing records that are accessible via a public internet.

9. The computer program product of claim 1, wherein the instructions are to cause the processor to determine a first participant that communicated the word or phrase and an order in which the first participant communicated the word or phrase relative to other participants, and based upon the order, apply an adjustment factor when assigning the score to the explanation identified from records accessible to the first participants.

10. A system comprising:
a processor; and
a memory storing instructions that when executed by the processor cause the processor to:
receive data indicative of a word or phrase communicated during a meeting attended by a plurality of participants,
for each participant, identify records electronically accessible to the participant, and associate each record with a record-relevancy tier from a hierarchy of record-relevancy tiers, wherein each tier is indicative of relevance to the meeting,
identify a plurality of explanations for the communication and for each explanation an associated score, including for each participant,
beginning with a most relevant tier, search records accessible to the participant tier by tier until an explanation is identified,
after identification of the explanation, score the explanation according to the tier associated with the record in which the explanation is identified,
determine, based upon the scores for the explanations, a preferred explanation, and cause a display of the preferred explanation.

11. The system of claim 10, wherein the display is a display for presentation to each of the participants.

12. The system of claim 10, wherein the communication is a first communication and the preferred explanation is a first preferred explanation;
wherein the display is a display of a set of communications and preferred explanations including the first communication and the first explanation, and a second communication with a second preferred explanation; and
wherein the processor is to, responsive to determining that a first preferred explanation among the set was identified in a more relevant tier than was the second preferred explanation, cause display of the first preferred explanation and its associated communication in a manner that ranks the first preferred explanation more highly than the second preferred explanation.

13. The system of claim 12, wherein ranking the first preferred explanation more highly than the second preferred explanation includes displaying the first communication or the first preferred explanation in a larger size or in a more central location than the second communication or the second preferred explanation.

14. The system of claim 12, wherein the processor is to enable a participant to interact with the display, and to, responsive to the interaction, revise the display so as to cause the second preferred explanation to be ranked more highly than the first preferred explanation.

15. A method, comprising:
receiving data indicative of a set of words or phrases verbally communicated during a meeting of a plurality of participants, including a first communication;
transcribing, by a processor, the first communication to a text form;
confirming, by the processor, via accessing a registry of stop words, that the first communication is not a stop word;
for each participant, identifying, by the processor, records electronically accessible to the participant, and associating each record with a tier from a hierarchy of record-relevancy tiers, wherein each tier is indicative of a relevance to the meeting;
identifying, by the processor, a set of explanations for the first communication and associated scores, including for each participant,
beginning with a most relevant tier, searching records accessible to the participant tier by tier until an explanation is identified, and responsive to identification of the explanation, assigning a score to the explanation according to the tier associated with the record in which the explanation is found;

determining, by the processor, based upon the scores, a preferred explanation for the first communication; and causing a display that includes the first communication, the preferred explanation, other words or phrases from the set, and explanations for the other words or phrases.

* * * * *